(12) United States Patent
Yang et al.

(10) Patent No.: US 11,515,655 B2
(45) Date of Patent: *Nov. 29, 2022

(54) HIGH-SPEED CONNECTOR FOR AUTOMOBILE

(71) Applicant: Amphenol AssembleTech(Xiamen) Co.,Ltd, Xiamen (CN)

(72) Inventors: Wenchu Yang, Xiamen (CN); Haitao Xiong, Xiamen (CN); Siting Liao, Xiamen (CN); Hang Li, Xiamen (CN); Hanyang Yin, Xiamen (CN)

(73) Assignee: AMPHENOL ASSEMBLETECH(XIAMEN) CO., LTD, Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/143,101

(22) Filed: Jan. 6, 2021

(65) Prior Publication Data

US 2021/0126391 A1 Apr. 29, 2021

Related U.S. Application Data

(63) Continuation-in-part of application No. 16/377,254, filed on Apr. 8, 2019, now Pat. No. 10,916,885.

(51) Int. Cl.
*H01R 13/627* (2006.01)
*H01R 12/77* (2011.01)
*H01R 12/79* (2011.01)
*B60R 16/02* (2006.01)

(52) U.S. Cl.
CPC ........... *H01R 12/774* (2013.01); *B60R 16/02* (2013.01); *H01R 12/79* (2013.01); *H01R 13/6273* (2013.01); *H01R 2201/26* (2013.01)

(58) Field of Classification Search
CPC ............ H01R 13/6275; H01R 13/6272; H01R 13/518; H01R 13/6273; H01R 12/75
See application file for complete search history.

(56) References Cited

U.S. PATENT DOCUMENTS 3,289,145 A * 11/1966 Frompovicz ........... H01R 13/74
439/357
3,475,718 A * 10/1969 Hartz ................... H01R 13/743
439/357

(Continued)

*Primary Examiner* — Thanh Tam T Le
(74) *Attorney, Agent, or Firm* — Bayramoglu Law Offices LLC

(57) ABSTRACT

A high-speed connector for an automobile includes a cable connector, a board connector connected to the cable connector, and sliding blocks provided on two sides of the cable connector. The sliding blocks are separate or are integrated. The cable connector includes a housing, a contact body and a cable. The contact body is installed in the housing. The contact body is in contact with the board connector to achieve an electric connection. The cable is connected to the contact body and protrudes out of the housing. The housing includes a main body portion and side snap-fit plates provided on two sides of the main body portion. A side snap-fit groove is provided on the side snap-fit plate. Side snap-fit clasps are provided on two sides of the board terminal connector. The sliding blocks are installed on the side snap-fit plates and slide upwards and downwards along the side snap-fit plates.

12 Claims, 15 Drawing Sheets

(56) References Cited

U.S. PATENT DOCUMENTS

| | | | | |
|---|---|---|---|---|
| 4,621,885 A * | 11/1986 | Szczesny | ............. | H01R 13/508 |
| | | | | 439/357 |
| 4,900,261 A * | 2/1990 | Gentry | ............... | H01R 13/6273 |
| | | | | 439/353 |
| 4,941,849 A * | 7/1990 | Fujiura | ............... | H01R 13/6582 |
| | | | | 439/357 |
| 4,944,693 A * | 7/1990 | Puerner | ............. | H01R 13/6273 |
| | | | | 439/357 |
| 4,961,711 A * | 10/1990 | Fujiura | .................. | H01R 12/75 |
| | | | | 439/357 |
| 5,613,870 A * | 3/1997 | Traver, Jr. | .......... | H01R 13/6273 |
| | | | | 439/352 |
| 5,915,987 A * | 6/1999 | Reed | .................. | H01R 13/6275 |
| | | | | 439/258 |
| 6,074,237 A * | 6/2000 | Lee | ...................... | H01R 4/2433 |
| | | | | 439/358 |
| 6,193,541 B1 * | 2/2001 | Lee | ...................... | H01R 12/675 |
| | | | | 439/358 |
| 6,517,372 B1 * | 2/2003 | Jones | .................. | H01R 13/635 |
| | | | | 439/352 |
| 7,083,465 B2 * | 8/2006 | Wu | ...................... | H01R 12/772 |
| | | | | 439/497 |
| 7,828,585 B2 * | 11/2010 | Kurimoto | ............ | H01R 12/714 |
| | | | | 439/942 |
| 8,152,556 B2 * | 4/2012 | Wu | ...................... | H01R 13/635 |
| | | | | 439/357 |
| 8,449,314 B1 * | 5/2013 | Feist | .................... | H01R 13/512 |
| | | | | 439/358 |
| 8,794,991 B2 * | 8/2014 | Ngo | .................. | H01R 13/6273 |
| | | | | 439/350 |
| 8,851,905 B2 * | 10/2014 | Soubh | ..................... | H01R 43/20 |
| | | | | 439/76.1 |
| 9,692,158 B1 * | 6/2017 | Vinther | ............... | H01R 13/6395 |
| 10,916,885 B2 * | 2/2021 | Yang | ...................... | H01R 12/79 |

* cited by examiner

HIGH-SPEED CONNECTOR FOR AUTOMOBILE

CROSS REFERENCE TO THE RELATED APPLICATIONS

This application is a continuation-in-part application of the U.S. application Ser. No. 16/377,254 which claims priority to Chinese Patent Application No. 201811379703.4, filed on Nov. 20, 2018, Chinese Patent Application No. 201810799536.2, filed on Jul. 19, 2018, and Chinese Patent Application No. 201820543745.6, filed on Apr. 17, 2018.

TECHNICAL FIELD

The present invention relates to the technical field of electrical connectors, and in particular to a high-speed connector for an automobile.

BACKGROUND

As the autonomous level of the intelligent driving automobile increases continuously, the requirements of data transmission speed and bandwidth are increasing for the automobile operation storage system. Further, a high and strict security and reliability of the operation storage system regarded as an automobile brain is required. In the application environment of the automobile, when the automobile is located in environments such as high and low temperatures, corrosion, impact, and vibration, the signal quality problems are prone to appear.

The currently available automobile connector fails to satisfy the requirements of data transmission required by the electronic system of the intelligent driving automobile, and fails to meet the trend of the system miniaturization. Meanwhile, the currently available high-speed connector fails to be applied in the automobile in the harsh environment.

SUMMARY

The present invention is aimed at providing a high-speed connector for an automobile, capable of meeting the size and operation requirements of the connector required by the automobile operation storage system.

In the present invention, the following technical solution is used to achieve the above-mentioned objective: a high-speed connector for an automobile includes a cable connector and a board connector connected to the cable connector, and further includes sliding blocks provided on two sides of the cable connector, the sliding blocks on the two sides are configured to be separated or integrated; the cable connector includes a housing, a contact body and a cable; the contact body is installed in the housing; the contact body is in contact with the board connector to achieve an electric connection; the cable is connected to the contact body, and extends out of the housing; the housing includes a main body portion and side snap-fit plates provided on two sides of the main body portion; a side snap-fit groove is provided in the side snap-fit plate; side snap-fit clasps are respectively provided on two sides of the board connector; the side snap-fit plates are buckled on two sides of the board connector by locking the side snap-fit clasps and the side snap-fit grooves; and the sliding blocks are installed on the side snap-fit plate, and slide along the side snap-fit plate.

Specifically, the contact body is a Printed Circuit Board (PCB) with a gold finger or a plastic board with a metal terminal.

Further, a front snap-fit plate is provided on a front surface of the main body portion of the housing; front snap-fit grooves are provided at two ends of the front snap-fit plate; front snap-fit clasps are provided on two ends of a front surface of the board connector; the front snap-fit plate is buckled on a front end of the board connector by locking the front snap-fit clasp and the front snap-fit groove; an extension wall is extendedly provided on a front surface of the sliding block; the extension wall is inserted between the front snap-fit plate and the main body portion.

Specifically, a first pushing sloped surface is provided on the inner wall of the front snap-fit plate; the extension wall moves along a direction towards the top side of the housing and moves on the first pushing sloped surface to push the front snap-fit plate to open outward; the front snap-fit groove of the front snap-fit plate and the front snap-fit clasp of the board connector are disengaged to form an unlocked state.

Preferably, a second pushing sloped surface is provided on the extension wall, and when the extension wall moves along a direction towards the top side of the housing, the second pushing sloped surface moves along the first pushing sloped surface.

Preferably, a guide sloped surface on the inner side of the front snap-fit plate is provided below the front snap-fit groove.

Further, a running groove is provided on an inner side of the sliding block and a pressing groove is provided on an outer side of the sliding block.

Further, a front side of the sliding block is provided with a front limiting clasp, and the front side of the main body portion of the housing is provided with a corresponding front snap-fit block. When the side snap-fit clasps and the side snap-fit grooves are locked, the front limiting clasp is limitedly installed on the front snap-fit block; when the sliding block slides upward to unlock, the front limiting clasp is separated from the front snap-fit block.

Further, a rear side of the sliding block is provided with a rear limiting clasp; a rear side of the main body portion of the housing is provided with a corresponding rear snap-fit block; the rear limiting clasp is installed on the rear snap-fit block, and can slide along the rear snap-fit block.

A limiting step for preventing the rear snap-fit clasp from continuing to slide upwardly is provided above the rear snap-fit block of the main body portion.

Preferably, a partition plate matched with the board connector is provided under the rear side of the main body portion of the housing.

Specifically, the front snap-fit plate is integrated or two ends of the front snap-fit plate are divided into two independent groups.

In an embodiment, the two ends of the front snap-fit plate are divided into the two independent groups; a guide partition plate is provided between the two independent groups of front snap-fit plates; a pair of dividing grooves is provided on the guide partition plate to divide the guide partition plate into a first limiting portion, a middle guide portion and a second limiting portion; the first limiting portion, the middle guide portion and the second limiting portion are connected to each other; the board connector includes a housing, a terminal and a shell; the terminal is arranged in the housing; the shell is wrapped around the housing; a partial surface of the shell protrudes outward to form an accommodating space between the partial surface and the housing, and the accommodating space is configured to accommodate the middle guide portion; the first limiting portion and the second limiting portion are engaged with an outside of the shell and on both sides of the accommodating space, respectively.

In another embodiment, the two ends of the front snap-fit plate are divided into the two independent groups; a guide partition plate is provided between the two independent groups of front snap-fit plates; a pair of dividing grooves is provided on the guide partition plate to divide the guide partition plate into a first guide portion, a middle limiting portion and a second guide portion; the first guide portion, the middle limiting portion and the second guide portion are connected to each other; the board connector includes a housing, a terminal, and a shell; the terminal is arranged in the housing, and the shell is wrapped around the housing; the first partial surface and the second partial surface of the shell both protrude outward to form a first accommodating space between the first partial surface and the housing and a second accommodating space between the second partial surface and the housing; the first accommodating space and the second accommodating space are configured to accommodate the first guide portion and the second guide portion, respectively; and the middle limiting portion is engaged between the outside of the shell, the first accommodating space and the second accommodating space.

Preferably, a side surface of the housing is provided with a plurality of convex platforms outwards; an inner wall of the main body portion of the housing of the cable connector is provided with a plurality of limiting grooves matched with the convex platforms.

Specifically, the rear side or the front side of the main body portion of the housing of the cable connector is provided with a cable outlet groove, and the cable extends out of the housing of the cable connector from the cable outlet groove.

According to the above-mentioned technical solution, the present invention has the following advantages:

1. The present invention can meet the strict testing requirements of the automobile connector. The structure is compact, which can meet the bandwidth requirement of the high-speed operation and storage, and realizes the technical requirements of a small interval and multi-channel. In the present invention, the sliding blocks on two sides are used to perform connection and unlocking, which is reliable, and space saving, and facilitates the unlocking operation.

2. In the present invention, side snap-fit plates are provided on two sides of the main body portion of the housing, and a front snap-fit plate is provided on the front surface, which realizes a double locking of the side ends and the front end. When any one of clasps is unlocked, the connector is ensured to work properly. Meanwhile, the front snap-fit clasp and the side snap-fit clasp are unlocked at the same time by sliding the sliding blocks on the two sides.

3. The two ends of the front snap-fit plate are separated into two independent groups, thereby reducing the length of the front snap-fit plate to facilitate unlocking. A guide partition plate is provided in the middle of the two independent groups of the front snap-fit plates to increase the reliability of the overall structure.

4. A guide sloped surface is provided below the front snap-fit groove, so that when the front snap-fit plate of the housing is matched with the front snap-fit clasp of the board connector, the guide sloped surface can play a role in the left and right guiding and avoid the left and right shaking caused by inclined insertion in the left and right direction.

5. A running groove is provided on the inner side of the sliding block to enable the sliding block to move upward. When the upper part of the sliding block is pressed, the side snap-fit plate is driven by the lower end of the sliding block to open outwards, thereby unlocking the side snap-fit plate, which has a better unlocking effect.

6. A front limiting clasp or/and a rear limiting clasp is provided on the front surface or/and the rear surface of the sliding block, and matched with the front snap-fit block or/and the rear snap-fit block of the housing to form a limiting structure, which can prevent the sliding block from overturning outward in the unlocking process, and avoid the pressing and unlocking invalidation of the sliding block.

7. A partition plate matched with the board connector is provided below the housing, which increases the matching reliability between the cable terminal and the board terminal.

8. The guide partition plate is divided into a limiting portion and a guide portion through the dividing groove. The limiting portion and the guide portion are engaged with the accommodating space of the shell to limit and guide in the front, back, left and right directions, thereby improving the reliability of the connection.

The reference numbers of the main components are illustrated below:

1: cable connector, 2: board connector, 21: housing, 211: convex platform, 22: terminal, 23: shell, 231: accommodating space, 232: surface protrusion, 24: side snap-fit clasp, 25: front snap-fit clasp, 26: guide portion, 27: limiting portion, 3: sliding block, 31: pressing groove, 32: extension wall, 321: second pushing sloped surface, 33: front limiting clasp, 34: rear limiting clasp, 35: running groove, 4: lower housing, 41: main body portion, 411: front snap-fit block, 412: rear snap-fit block, 413: partition plate, 414: guide sloped surface 42: side snap-fit plate, 421: side snap-fit groove, 43: front snap-fit plate, 431: front snap-fit groove, 432: convex portion, 433: contact portion, 434: guide sloped surface, 435: first pushing sloped surface, 44: guide partition plate, 441: limiting groove, 45: limiting step, 46: cable outlet groove, 5: upper housing, 6: PCB, 7: cable.

DETAILED DESCRIPTION OF THE EMBODIMENTS

In order to clarify the objectives, technical solutions and advantages of the present invention, the present invention will be further described in detail hereinafter with reference to the drawings and embodiments.

Embodiment 1

Figure 1:
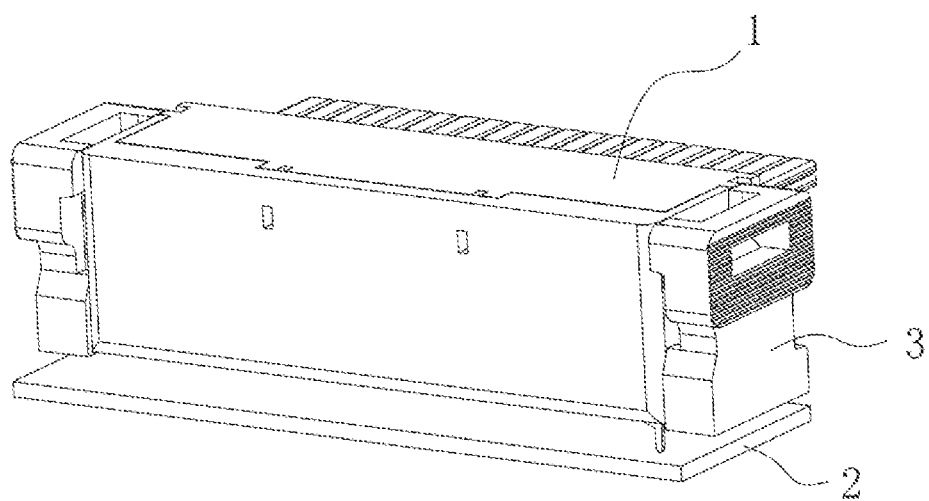
FIG. 1 is a structural schematic diagram showing a locking state of Embodiment 1.
Figure 2:
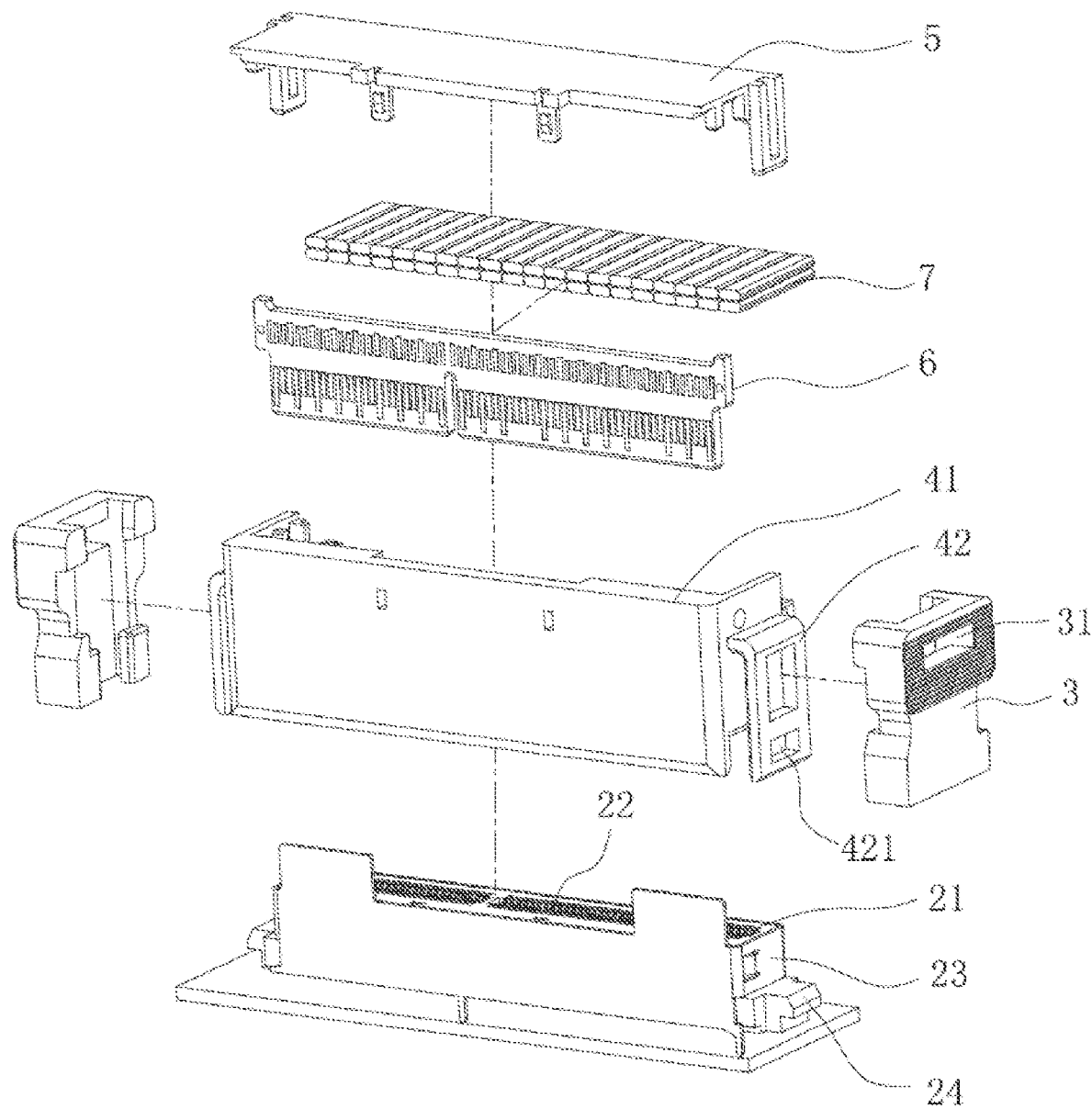
FIG. 2 is an exploded view of FIG. 1.
Figure 3:
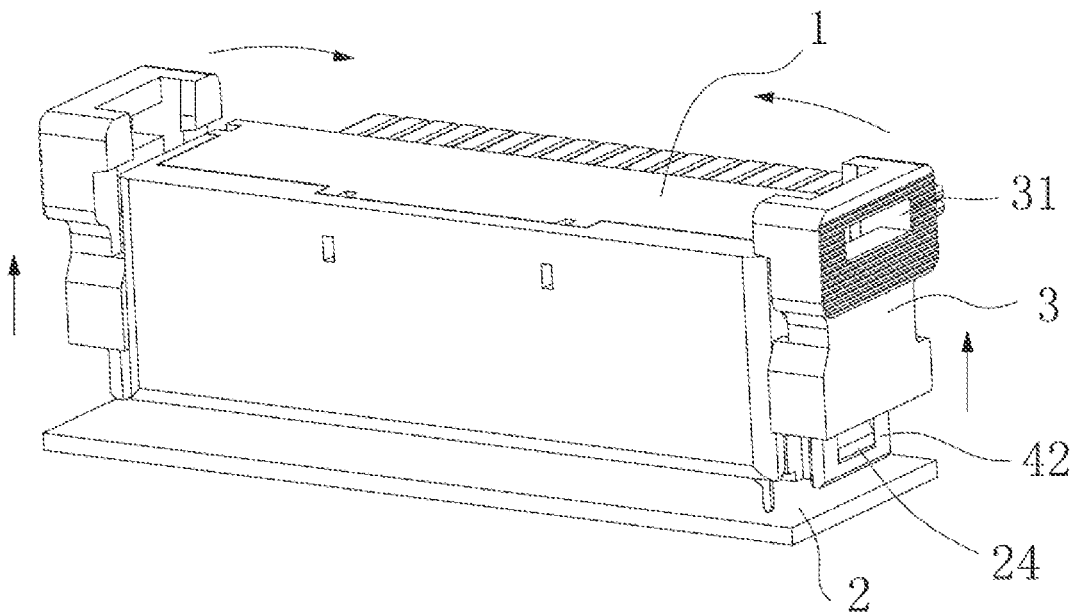
FIG. 3 is a schematic diagram showing an unlocked state of FIG. 1.

As shown in FIG. 1 to FIG. 3, the present embodiment discloses a high-speed connector for an automobile, including a cable connector 1, a board connector 2, and two groups of sliding blocks 3. The board connector 2 includes a housing 21, a terminal 22 and a shell 23. The terminal 22 is provided inside the housing 21. The shell 23 is wrapped around the housing 21. The cable connector 1 includes a housing, a contact body and a cable 7. The contact body is installed inside the housing. The contact body is configured for being inserted into the terminal of the board connector to realize electrical connection. In general, the contact body is a PCB with a gold finger or a plastic board with a metal terminal. In the present embodiment, the contact body is a PCB 6, and the gold finger terminal of the PCB 6 is exposed outside the housing, and is in contact with the terminal 22 in the board connector 2 to achieve an electric connection. The cable 7 is connected to the PCB 6 and extends out of the housing. The housing is an assembled housing, including a lower housing 4 and an upper housing 5 assembled with the lower housing 4. The shell is preferably an iron housing.

The lower housing 4 includes a main body portion 41 and side snap-fit plates 42 provided on two sides of the main body portion 41. A side snap-fit groove 421 is provided on the side snap-fit plate 42. Side snap-fit clasps 24 are provided on two sides of the board connector 2, and the side snap-fit clasp 24 and the side snap-fit groove 421 are locked to fasten the side snap-fit plates 42 on the two sides of the board connector 2. The sliding blocks 3 are installed on the side snap-fit plate 42 and slide upwards and downwards along the side snap-fit plates 42. A pressing groove 31 is provided on the side surface of the sliding block 3.

In the installation process, the board connector 2 is welded on the PCB, and then the sliding blocks 3 are installed so that the sliding blocks 3 are assembled on the side snap-fit plate 42 of the cable connector 1. After that, the cable connector 1 with the sliding blocks 3 is inserted into the board connector 2, so that the sliding blocks 3 slide towards the board connector 2 until the sliding blocks 3 overlap the side snap-fit clasps 24, and the side snap-fit groove 421 on the side snap-fit plate 42 and the side snap-fit clasp 24 are locked. As shown in FIG. 3, when the unlocking is required, the sliding block 3 is drawn back until the pressing groove 31 of the sliding block 3 protrudes out of the upper end of the upper housing 5. At this time, the side snap-fit clasp 24 is exposed. When the pressing grooves 31 of the two groups of the sliding blocks 3 are pressed, the lower end of the sliding block 3 drives the side snap-fit plate 42 to open outwards according to the leverage principle, so as to make the side snap-fit clasp 24 separated from the side snap-fit groove 421, thereby realizing the unlocking.

Embodiment 2

Figure 4:
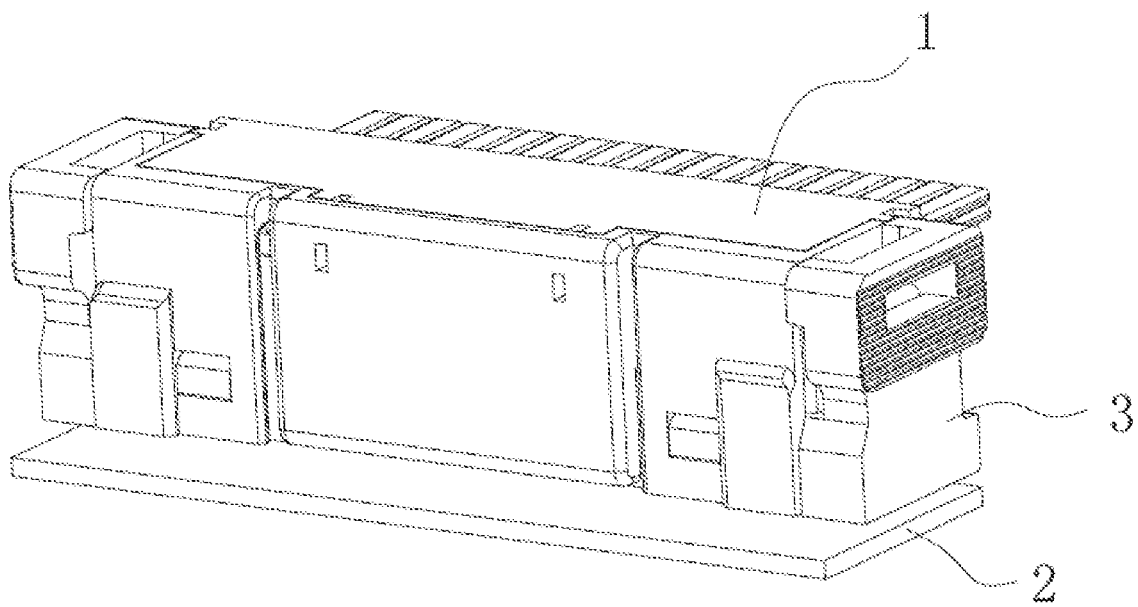
FIG. 4 is a structural schematic diagram showing a locking state of Embodiment 2.
Figure 5:
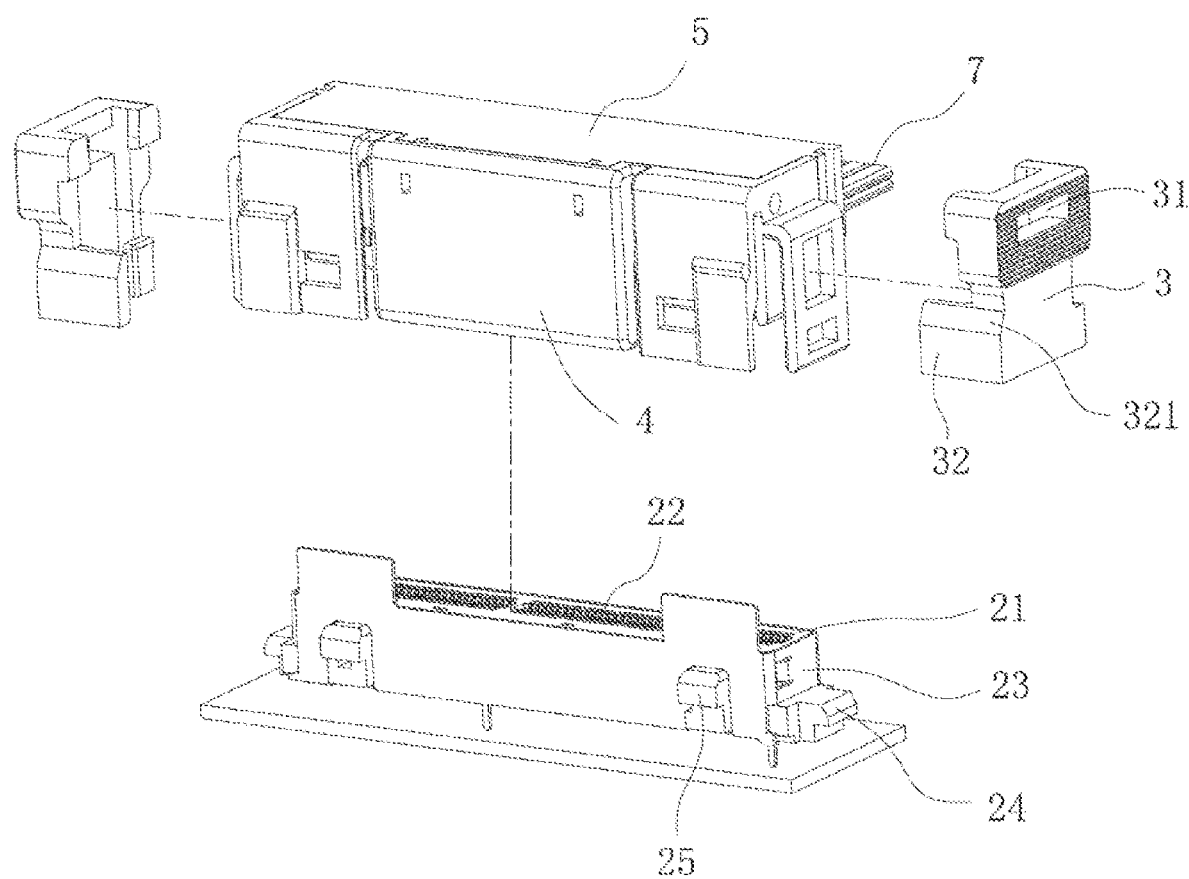
FIG. 5 is an exploded view of FIG. 4.
Figure 6:
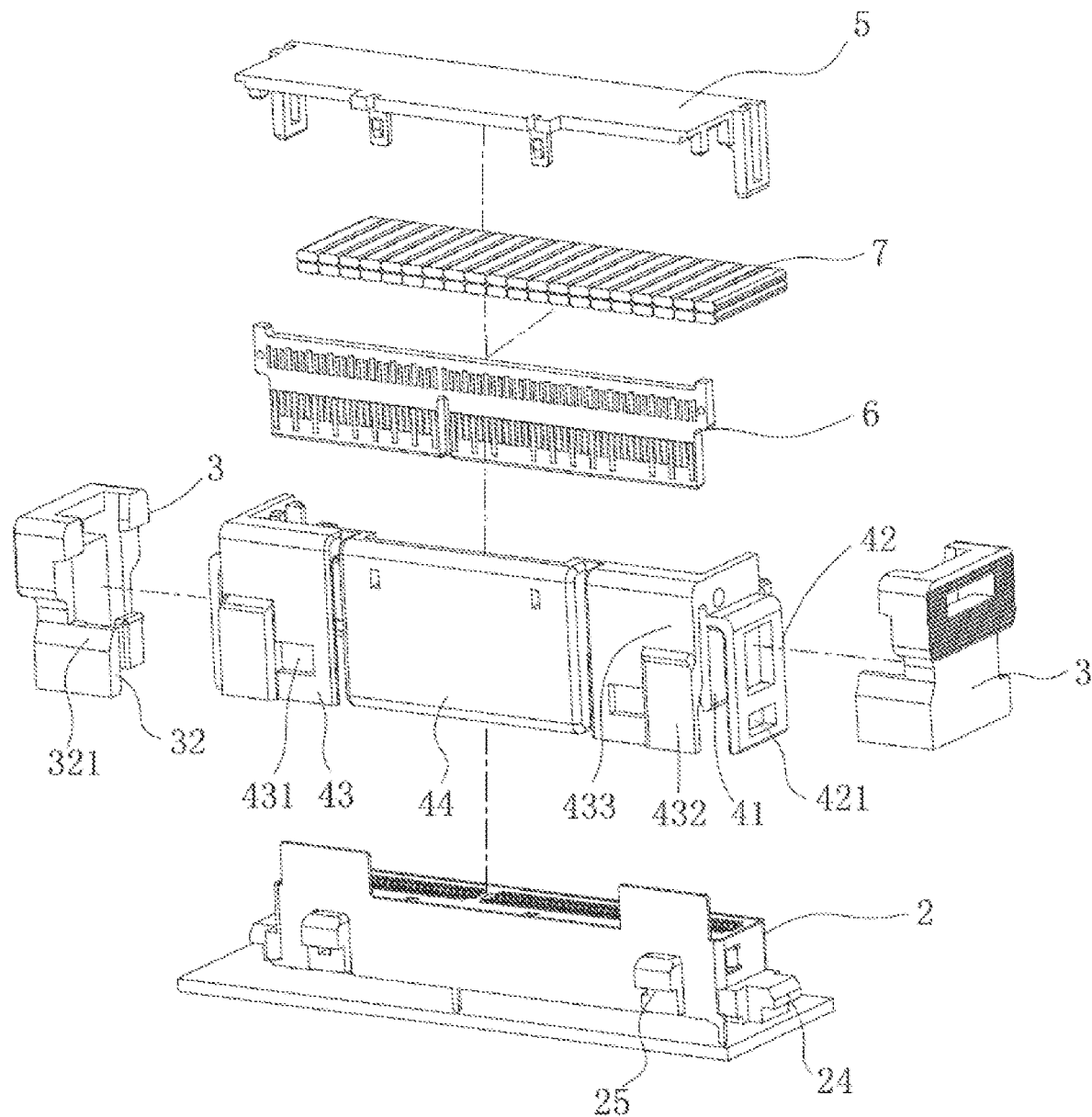
FIG. 6 is a further exploded view of FIG. 5.

As shown in FIG. 4 to FIG. 6, the present embodiment discloses a high-speed connector for an automobile, including a cable connector 1, a board connector 2, and two groups of sliding blocks 3. The board connector 2 includes a housing 21, a terminal 22 and a shell 23. The terminal 22 is provided inside the housing 21. The shell 23 is wrapped around the housing 21. The cable connector 1 includes a housing, a PCB 6 and a cable 7. The PCB 6 is installed inside the housing. The gold finger terminal of the PCB 6 is exposed out of the housing, and is in contact with the terminal 22 in the board connector 2 to achieve an electric connection. The cable 7 is connected to the PCB 6 and extends out of the housing.

In the present embodiment, the housing includes a lower housing 4 and an upper housing 5 assembled with the lower housing 4. The lower housing 4 includes a main body portion 41, side snap-fit plates 42 provided on two sides of the main body portion 41, and two groups of independent front snap-fit plates 43 on the front surface of the main body portion 41. A guide partition plate 44 is provided in the middle of the two groups of independent front snap-fit plates 43.

A side snap-fit groove 421 is provided on the side snap-fit plate 42. Side snap-fit clasps 24 are provided on two sides of the board connector 2. The side snap-fit clasp 24 and the side snap-fit groove 421 are locked to fasten the side snap-fit plates 42 on the two sides of the board connector 2. A front snap-fit groove 431 is provided on an end portion of the front snap-fit plate 43. The front snap-fit clasps 25 are provided on two ends of the front surface of the board connector 2. The front snap-fit clasp 25 and the front snap-fit groove 431 are locked to fasten the front snap-fit plate 43 on the front end of the board connector 2.

An extension wall 32 is extendedly provided on the front surface of the sliding block 3, and inserted between the front snap-fit plate 43 and the main body portion 41. The front snap-fit plate 43 and an insertion portion of the extension wall 32 are respectively provided with a convex portion 432 and a contact portion 433 located above the convex portion 432. A first pushing sloped surface 435 is provided on the inner wall of the front snap-fit plate 43. A second pushing sloped surface 321 is provided on the extension wall 32. When the extension wall 32 is inserted from the convex portion 432 and moves along the direction towards the top side of the housing, the second pushing sloped surface 321 moves along the first pushing sloped surface 435 to enable the front snap-fit plate 43 to open outwards, so that the front snap-fit groove 431 of the front snap-fit plate 43 is disengaged from the front snap-fit clasp 25 of the board connector to form an unlocked state.

Figure 7:
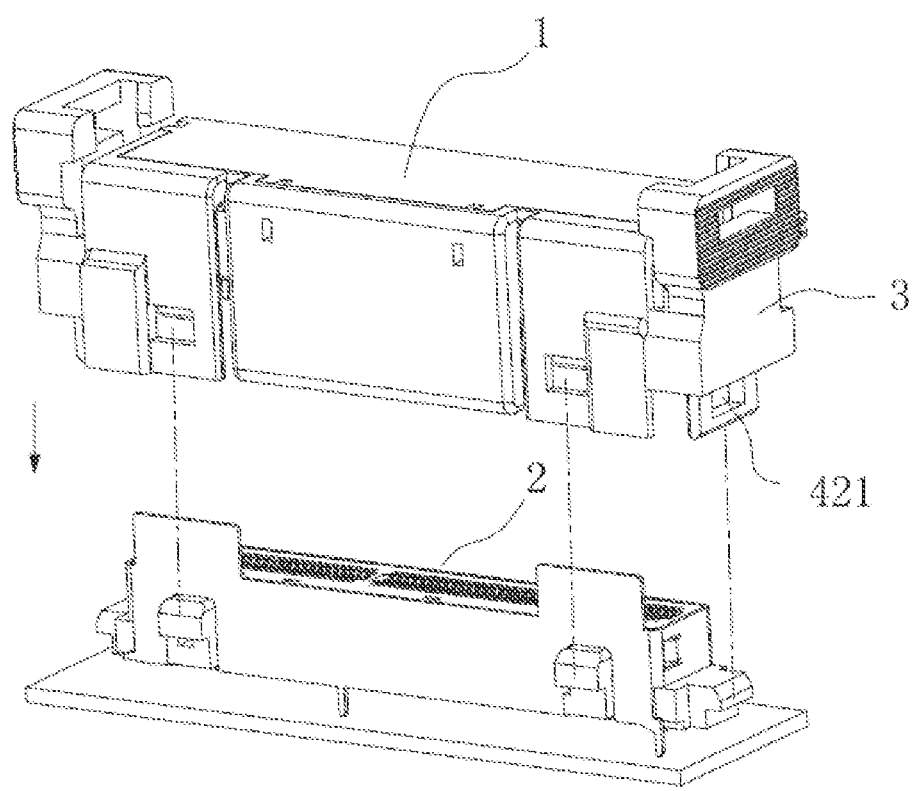
FIG. 7 is a schematic diagram showing an installation state of Embodiment 2.

As shown in FIG. 7, in the installation process, the board connector 2 is welded on the PCB, and then the sliding blocks 3 are installed so that the sliding blocks 3 are assembled on the side snap-fit plate 42 of the cable connector 1, and the extension wall 32 of the sliding block 3 is inserted between the convex portion 432 and the main body portion 41. After that, the front end of the cable connector 1 with the sliding blocks 3 is inserted into the board connector 2, so that the side snap-fit groove 421 on the side snap-fit plate 42 and the side snap-fit clasp 24 are locked, and the front card snap-fit groove 431 of the front snap-fit plate 43 and the front snap-fit clasp 25 are locked.

Figure 8:
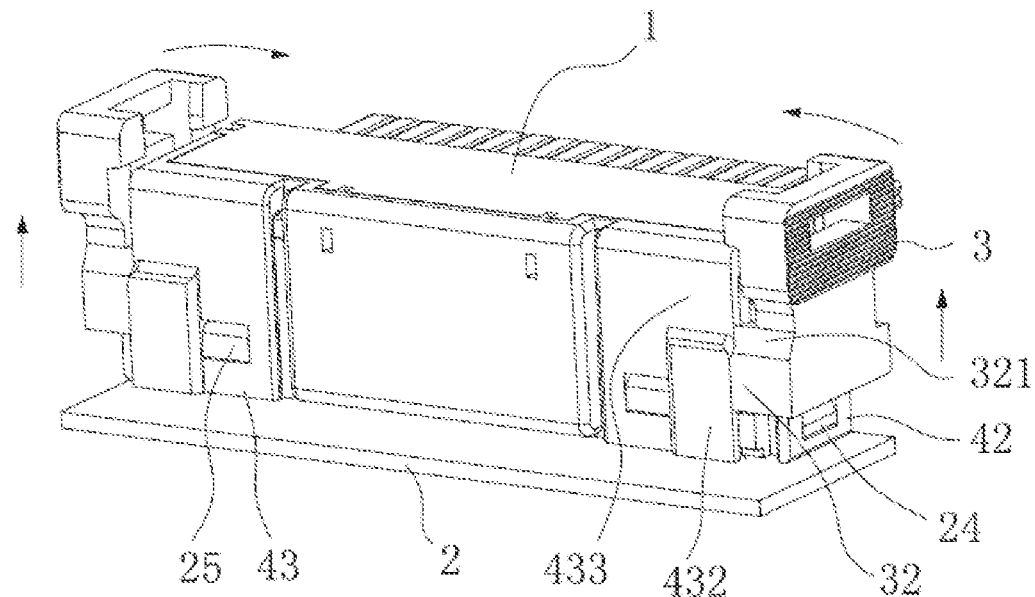
FIG. 8 is a schematic diagram showing an unlocked state of Embodiment 2.
Figure 9:
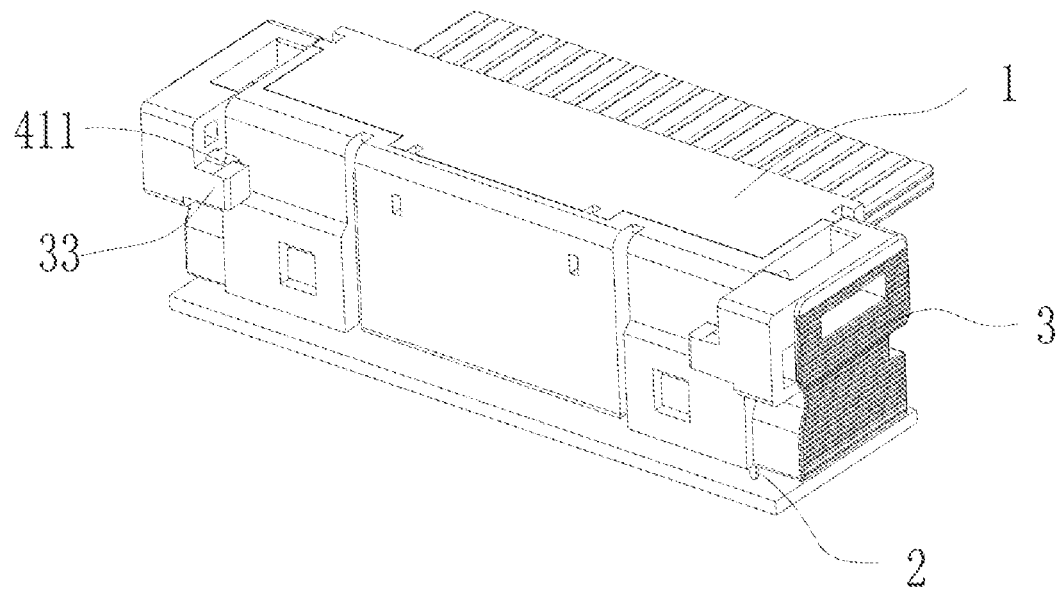
FIG. 9 is a structural schematic diagram showing a locking state of Embodiment 3.

As shown in FIG. 8, when the unlocking is required, two steps used in the unlocking are as follows: (1) drawing back the sliding block 3, the second pushing sloped surface 321 of the extension wall 32 is initially located at the accommodating space between the convex portion 432 and the main body portion 41 with no interference state; when the sliding block slides to intervene with the first pushing sloped surface 435, a lower portion of the front snap-fit plate 43 is deformed to open outwards, and the front snap-fit clasp 25 is separated from the front snap-fit groove 431 to realize the unlocking. (2) continuing to draw back the sliding block 3, the pressing groove 31 of the sliding block 3 protrudes out of the upper end of the upper housing 5, and at this time, the side snap-fit clasp 24 is exposed. When the pressing grooves 31 of the two groups of the sliding blocks 3 are pressed, the lower end of the sliding block 3 drives the side snap-fit plate 42 to open outwards according to the leverage principle, so as to make the side snap-fit clasp 24 separated from the side snap-fit groove 421, thus realizing the unlocking, and the cable connector 1 can be pulled out.

Embodiment 3

As shown in FIG. 9 to FIG. 12, the present embodiment discloses a high-speed connector for an automobile, including a cable connector 1, a board connector 2, and two groups of sliding blocks 3. The structure of the board connector 2 is the same as that in Embodiment 2. The cable connector 1 includes a housing, a PCB 6 and a cable 7. The PCB 6 is installed in the housing. The gold finger terminal of the PCB 6 is exposed out of the housing, and is in contact with the terminal 22 in the board connector 2 to achieve an electric connection. The cable 7 is connected to the PCB 6 and extends out of the housing. The housing includes a lower housing 4 and an upper housing 5 assembled with the lower housing 4.

Figure 13:
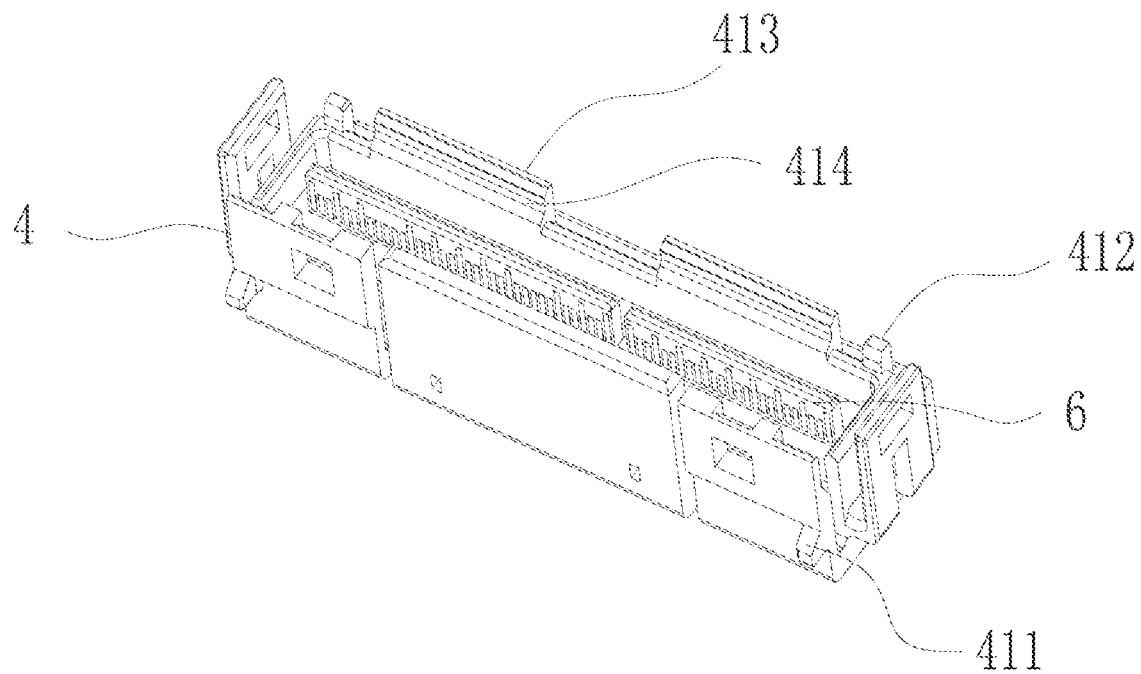
FIG. 13 is a structural schematic diagram showing a lower housing mounted with a PCB in Embodiment 3.
Figure 14:
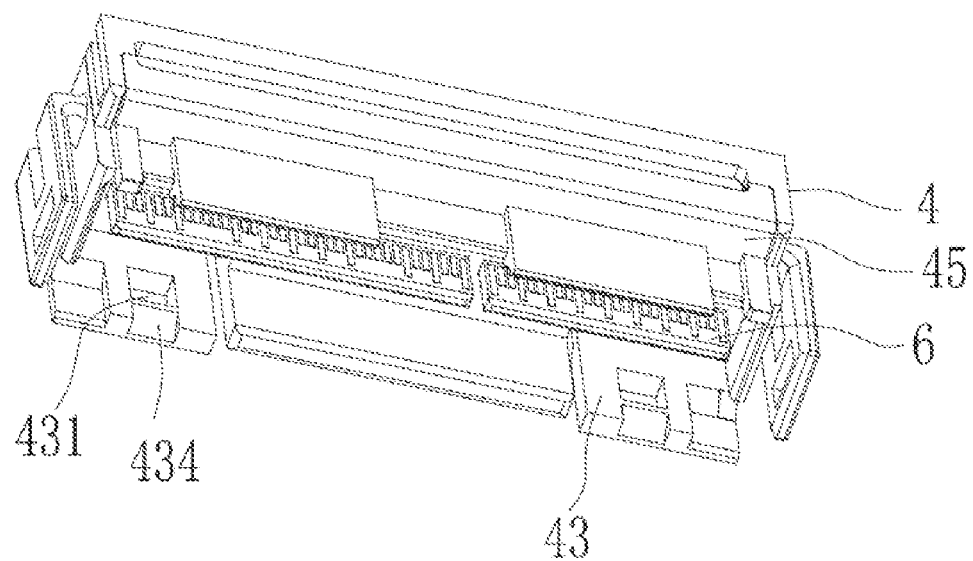
FIG. 14 is a structural schematic diagram of FIG. 13 from another view.

The lower housing 4 includes a main body portion 41, side snap-fit plates 42 provided on two sides of the main body portion 41, and two groups of independent front snap-fit plates 43 provided on the front surface of the main body portion 41. A guide partition plate 44 is provided in the middle of the two groups of independent front snap-fit plates 43. A side snap-fit groove 421 is provided on the side snap-fit plate 42. Side snap-fit clasps 24 are provided on two sides of the board connector 2, and locked with the side snap-fit grooves 421 to fasten the side snap-fit plates 42 on the two sides of the board connector 2. A front snap-fit groove 431 is provided on the end portion of the front snap-fit plate 43, front snap-fit clasps 25 are provided on two ends of the front surface of the board connector 2, and the front snap-fit clasp 25 is locked with the front snap-fit groove 431 to fasten the front snap-fit plate 43 on the front end of the board connector 2. As shown in FIG. 14, a guide sloped surface 434 is provided below the front snap-fit groove 431, so that the front snap-fit plate 43 is matched with the front snap-fit clasp 25 to play a role in guiding in the left and right directions. As shown in FIG. 13, a front snap-fit block 411 is provided on the front surface of the main body portion 41, and a rear snap-fit block 412 is provided on the rear surface thereof. A limiting step 45 of the main body portion 41 is provided above the rear snap-fit block 412. A partition plate 413 matched with the board connector 2 is provided below the main body portion 41. A guide sloped surface 414 is provided on the inner side of the partition plate 413.

Figure 15:
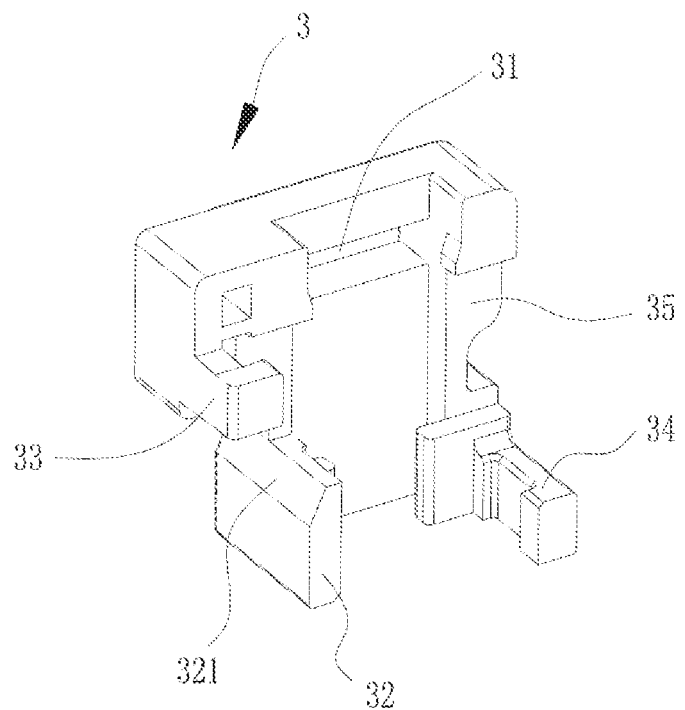
FIG. 15 is a structural schematic diagram showing a sliding block of Embodiment 3.

As shown in FIG. 15, an extension wall 32 extends from the front side of the sliding block 3, and the extension wall 32 is inserted between the front snap-fit plate 43 and the main body portion 41. The front snap-fit plate 43 and the insertion portion of the extension wall 32 are provided with a convex portion 432 and a contact portion 433 above the convex portion 432. The inner wall of the front snap-fit plate 43 is provided with a first pushing sloped surface 435, and the extension wall 32 is provided with a second pushing sloped surface 321. When the extension wall 32 is inserted from the convex portion 432 and moves along the direction towards the top side of the housing, the second pushing sloped surface 321 moves along the first pushing sloped surface 435, so that the front snap-fit plate 43 opens outwards to disengage the front snap-fit groove 431 of the front snap-fit plate 43 from the front snap-fit clasp 25 of the board connector, thereby forming an unlocked state.

A front limiting clasp 33 is provided on the front surface of the sliding block 3. When the side snap-fit clasps 24 are locked with the side snap-fit grooves 421, the front limiting clasp 33 is fixedly mounted on the front snap-fit block 411. When the sliding block 3 slides upward to unlock, the front limiting clasp 33 is separated from the front snap-fit block 411.

A rear limiting clasp 34 is provided on the rear surface of the sliding block 3. The rear limiting clasp 34 is mounted on the rear snap-fit block 412 and can slide along the rear snap-fit block 412. A running groove 35 is provided on the inner side of the sliding block 3. A pressing groove 31 is provided on the outer side of the sliding block 3. When the sliding block slides upward until the upper surface of the running groove 35 and protrudes out of the top of the housing, the bottom of the sliding block 3 is located above the side snap-fit plate 42, and the pressing groove 31 is located above the housing.

Figure 10:
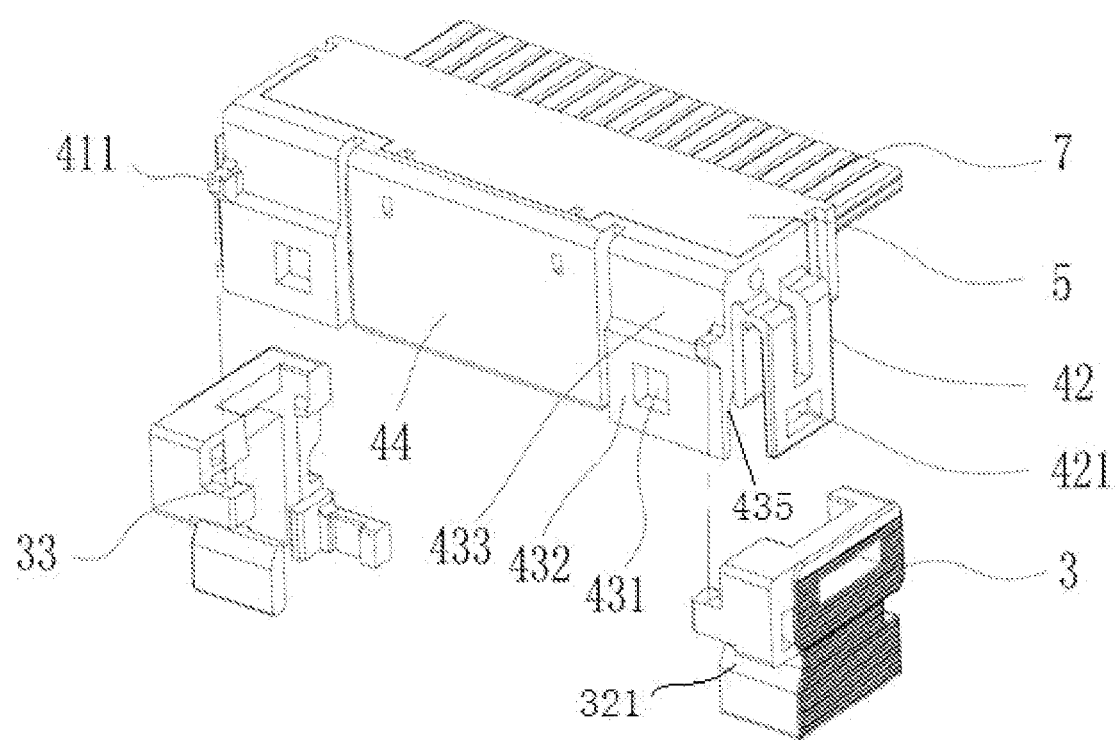
FIG. 10 is an exploded view of FIG. 9 without the board connector.
Figure 11:
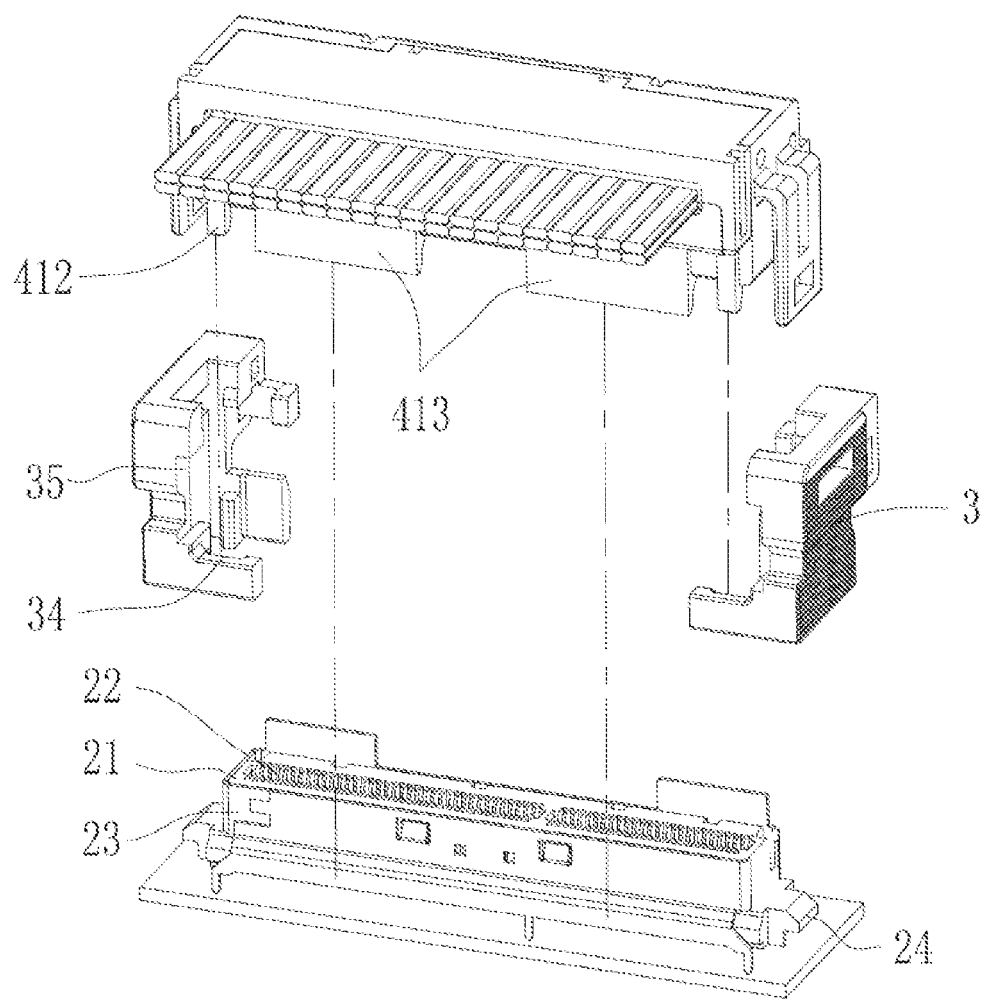
FIG. 11 is an exploded view of FIG. 9 in a rear perspective.
Figure 12:
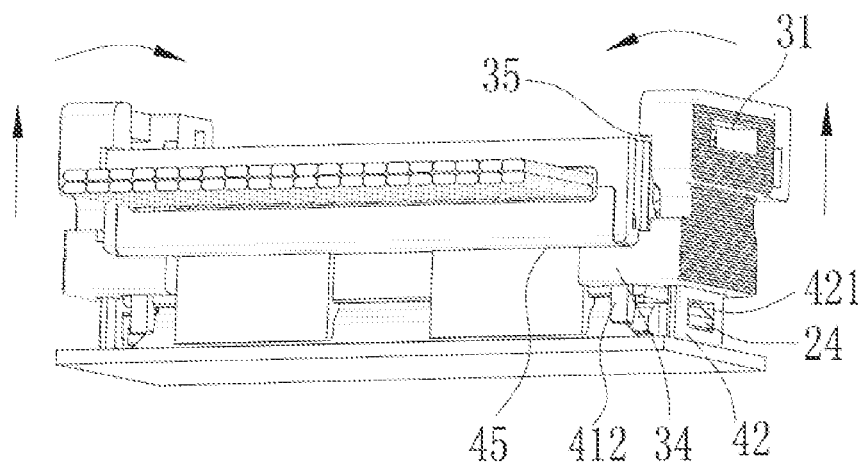
FIG. 12 is a schematic diagram showing an unlocked state of Embodiment 3.

As shown in FIG. 10 and FIG. 11, in the installation process, the board connector 2 is welded to the PCB, and then the sliding blocks 3 are installed upwards, so that the sliding blocks 3 are assembled on the side snap-fit plate 42 of the cable connector 1. The rear limiting clasp 34 is installed on the rear snap-fit block 412, so that the extension wall 32 of the sliding block 3 is inserted between the convex portion 432 and the main body portion 41, and is installed upward until the front limiting clasp 33 is installed on the front snap-fit block 411. After that, the cable connector 1 with the sliding blocks 3 is inserted into the board connector 2, and the guide sloped surface 414 on the inner side of the partition plate 413 guides the lower housing 4 to be inserted directly in the housing 21. At this time, the side snap-fit groove 421 on the side snap-fit plate 42 and the side snap-fit clasp 24 are locked, and the front snap-fit groove 431 of the front snap-fit plate 43 and the front snap-fit clasp 25 are locked. As shown in FIG. 12, the process of unlocking is the same as that in Embodiment 2. In step (1), the front snap-fit plate and the front snap-fit clasp are unlocked. In step (2), when the sliding block 3 continues to slide upward, the rear limiting clasp 34 slides on the rear snap-fit block 412 until contacting the limiting step 45. At this time, the sliding block 3 does not slide upwards any longer. The limiting step 45 is configured to prevent the sliding block 3 from being pushed out upwards due to excessive force. At this time, the upper surface of the running groove 35 and the pressing groove 31 extend out of the top of the housing. By pressing the pressing groove 31, the upper portion of the sliding block 3 moves inwards within the range of the running groove 35. According to the leverage principle, the side snap-fit clap is driven by the bottom of the sliding block 3 to open outwards, so that the side snap-fit clasp 24 is separated from the side snap-fit groove 421 to realize the unlocking. After the unlocking, the cable connector 1 can be pulled out.

Embodiment 4

Figure 16:
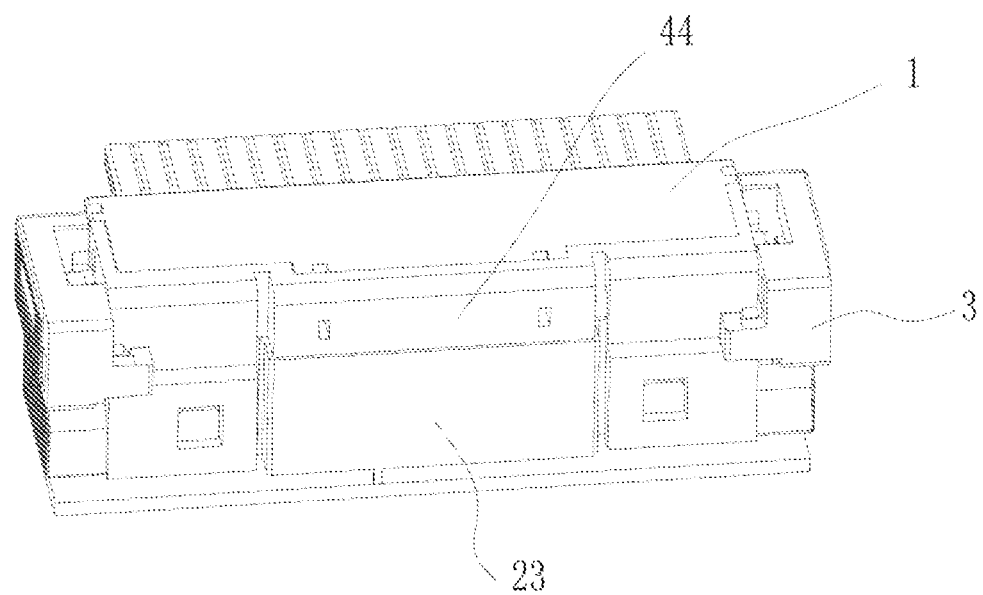
FIG. 16 is a structural schematic diagram of Embodiment 4.
Figure 17:
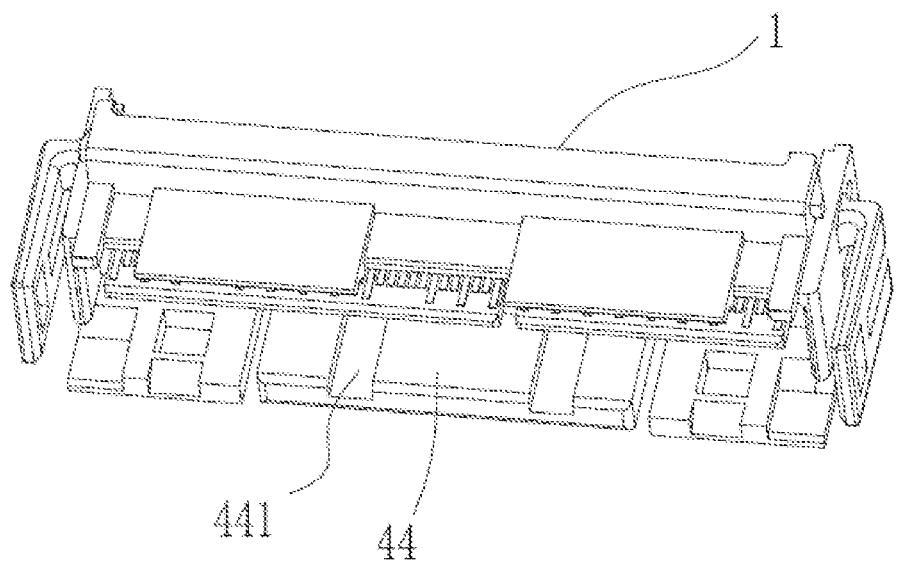
FIG. 17 is a structural schematic diagram showing a cable connector in Embodiment 4.
Figure 18:
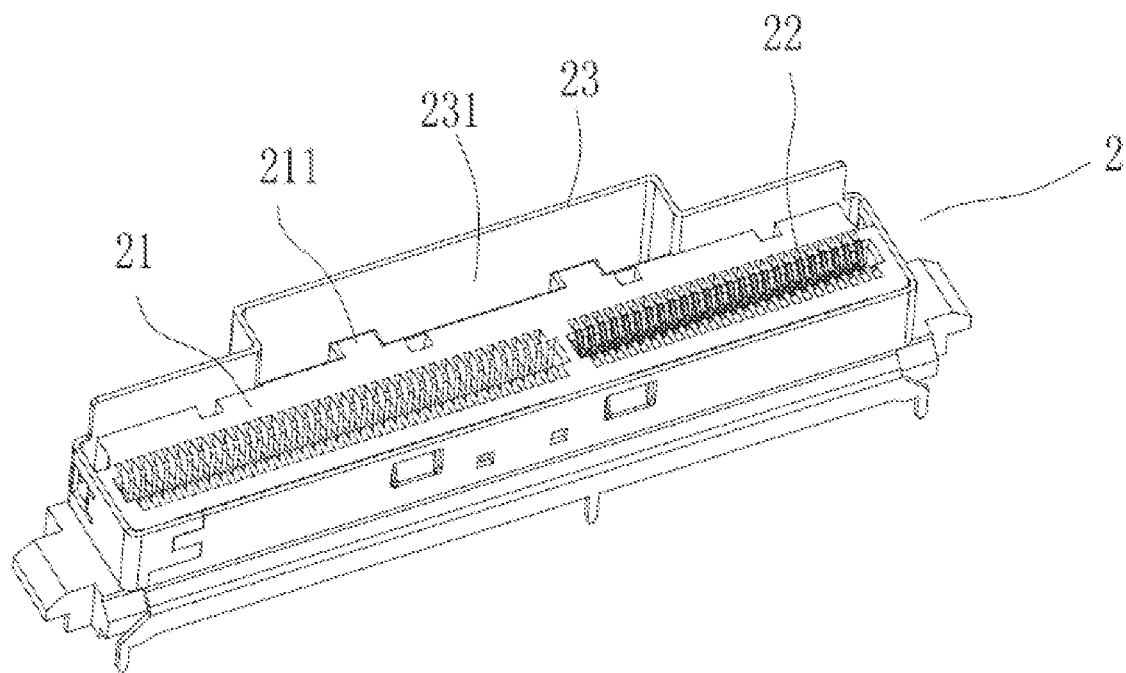
FIG. 18 is a structural schematic diagram showing a board connector in Embodiment 4.

As shown in FIG. 16 to FIG. 18, the present embodiment discloses a high-speed connector for an automobile. The differences from Embodiment 3 include; the front surface of the shell 23 of the board connector 2 is bent outwards to form an accommodating space 231. The dimension of the accommodating space 231 is matched with the guide partition plate 44 of the cable connector 1. The outer side of the housing 21 of the board connector 2 protrudes outwards to form two convex platforms 211. Two limiting grooves 441 matched with the convex platforms 211 are provided on the inner wall of the guide partition plate 44. In the process of inserting, the two convex platforms 211 are inserted into the two limiting grooves 441, and the guide partition plate 44 is covered by the accommodating space 231. The rest of the structure is the same as that in Embodiment 3.

Alternatively, in another embodiment, the rear surface of the shell 23 of the board connector 2 is bent outwards to form an accommodating space. A limiting partition plate (not shown in the drawings) is correspondingly provided on the rear surface of the main body portion of the cable connector. The dimension of the accommodating space is matched with the limit partition plate. The inner side of the housing of the board connector protrudes outwards to form two convex platforms. Two limiting grooves matched with the convex platforms are provided on the inner wall of the main body portion of the cable connector. The rest of the structure is the same as that of Embodiment 3.

The above-mentioned limiting structure on the outer side or the inner side of the board connector is used to limit positions in the left, right, front and rear directions when the inserted connection of the cable terminal and the board terminal is performed.

Embodiment 5

Figure 19:
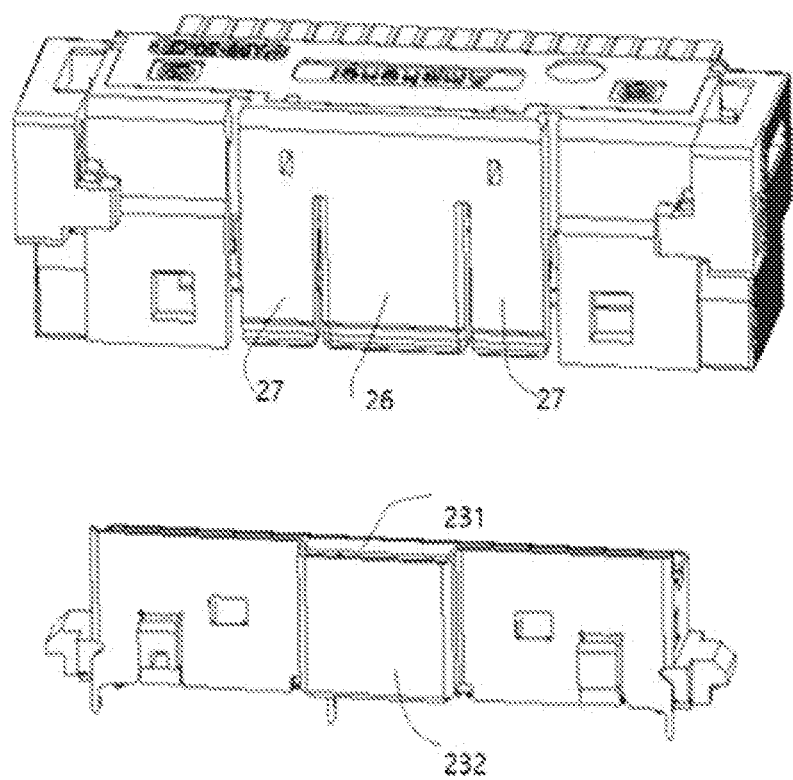
FIG. 19 is an exploded view showing the board connector and the corresponding cable connector in Embodiment 5.

As shown in FIG. 19, this embodiment discloses an automobile connector. The difference from Embodiment 4 is that a pair of dividing grooves is provided on the guide partition plate on the front surface of the lower housing 4, and the guide partition plate is divided into a middle guide portion 26 and the limiting portions 27 on the two sides. The top surface of the shell 23 of the board connector 2 is open, and the bottom surface and four sides thereof are provided with partition plates. The board connector 2 also includes a housing 21 and a terminal 22. The terminal 22 is located in the housing 21, and the shell 23 is wrapped around the housing 21. Similar to Embodiment 4, the front surface of the shell 23 of the board connector 2 is bent outwards at the position corresponding to the middle guide portion 26 of the lower housing 4 to form a surface protrusion 232. The surface protrusion 232 and the housing form an accommodating space 231. The accommodating space 231 is configured to accommodate the middle guide portion 26 of the lower housing 4. After assembly, the two limiting portions 27 of the lower housing 4 cover the partial surface of the shell 23. The accommodating space 231 of the shell 23 covers the middle guide portion 26 of the lower housing 4. The other structures and the unlocking method are the same as those of Embodiment 3. The guide portion prevents the cable connector from tilting back and forth.

Embodiment 6

Figure 20:
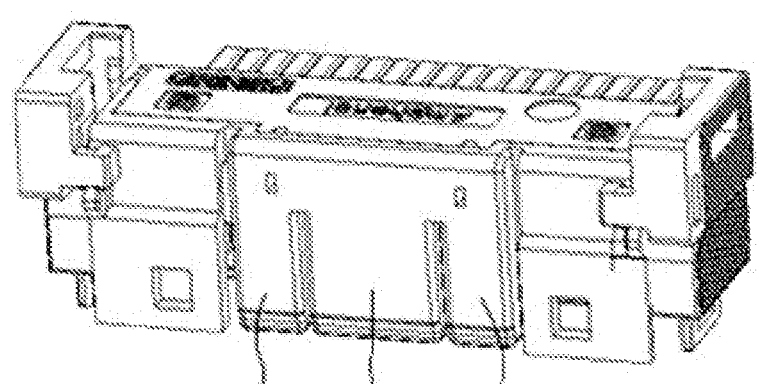
FIG. 20 is an exploded view showing the board connector and the corresponding cable connector in Embodiment 6.
Figure 20:
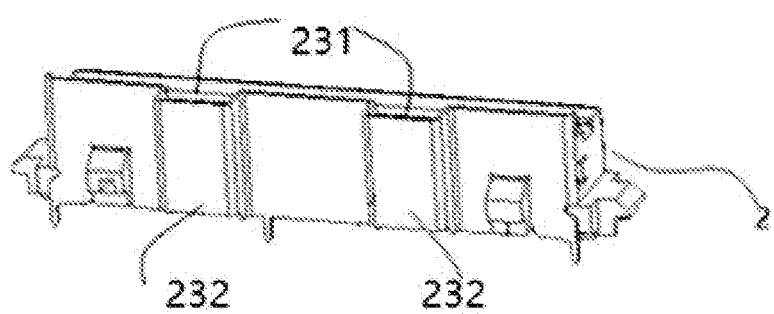

As shown in FIG. 20, this embodiment discloses an automobile connector. Similar to Embodiment 5, a pair of dividing grooves is provided on the guide partition plate on the front surface of the lower housing 4, and the guide partition plate is divided into the middle limiting portion 27 and the guide portions 26 on the two sides. The top surface of the shell 23 of the board connector 2 is open, and the bottom surface and four sides thereof are provided with partition plates. The board connector 2 also includes a housing 21 and a terminal 22. The terminal 22 is located in the housing 21, the shell 23 is wrapped around the housing 21. The front surface of the shell 23 of the board connector 2 is bent outwards at the position corresponding to the two guide portions 26 of the lower housing 4 to form two surface protrusions 232. The surface protrusions 232 and the housing form accommodating spaces 231, and the accommodating spaces 231 are configured to accommodate the two guide portions 26 of the lower housing 4 at the left and right side. After assembly, the middle limiting portion 27 of the lower housing 4 covers the partial surface of the shell 23, and the two accommodating spaces 231 of the shell 23 cover the two guide portions 26 of the lower housing 4. The other structures and the unlocking method are the same as those of Embodiment 3. The two guide portions are configured to well prevent the cable connector 1 from tilting back and forth and left and right.

Embodiment 7

Figure 21:
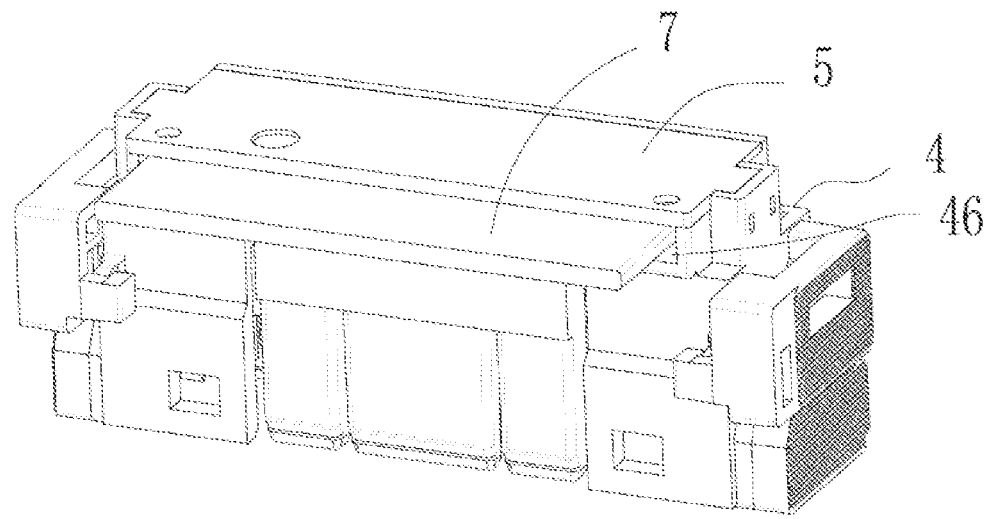
FIG. 21 is a structural schematic diagram of the cable connector in Embodiment 7.
Figure 22:
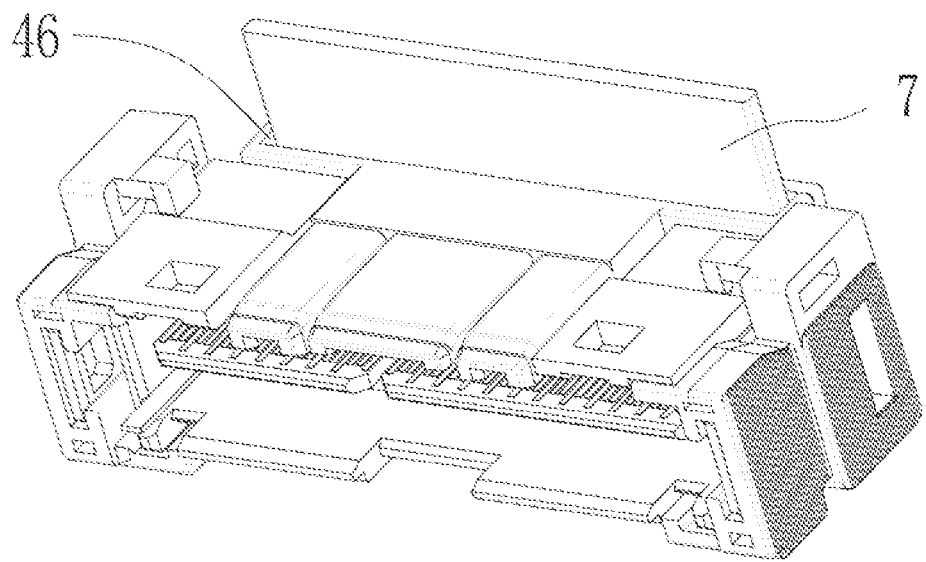
FIG. 22 is a structural schematic diagram of the cable connector from another angle in Embodiment 7.

As shown in FIGS. 21 and 22, this embodiment discloses an automobile connector similar to Embodiment 6. In the figure of Embodiment 6, the cable 7 protrudes from the rear surface of the lower housing 4. When the cable is specially required to protrude reversely, the cable is limited by the space on the front surface of the lower housing 4. Therefore, as shown in FIG. 21 and FIG. 22, the height of the lower housing 4 is increased, and a cable outlet groove 46 is formed at the heightened portion such that the cable 7 extends out of the housing from the cable outlet groove 46.

The high-speed connector of the present invention is suitable in an environment such as high and low temperatures, corrosion, shock and vibration, and has a high practicability.

The above descriptions are only preferred embodiments of the present invention, but the protection scope of the present invention is not limited thereby. The changes or substitutions obtained easily by any person skilled in the art within the technical scope disclosed by the present invention would be within the scope of the present invention.

The invention claimed is:

1. A high-speed connector for an automobile, comprising: a cable connector, a board connector connected to the cable connector and sliding blocks on two sides of the cable connector, wherein the sliding blocks on the two sides are configured to be separated or integrated; the cable connector comprises a housing, a contact body and a cable; the contact body is installed in the housing; the contact body is in contact with the board connector to achieve an electric connection; the cable is connected to the contact body and extends out of the housing; the housing comprises a main body portion and a side snap-fit plate provided on each side of the main body portion; a side snap-fit groove is formed through each of the side snap-fit plates; side snap-fit clasps are provided on two sides of the board connector; the side snap-fit plates are buckled on the two sides of the board connector by locking the side snap-fit clasps and the side snap-fit grooves; and the sliding blocks are installed on the side snap-fit plate, and are configured to slide along the side snap-fit plates;

wherein, a front snap-fit plate is provided on a front surface of the main body portion of the housing; front snap-fit grooves are provided at two ends of the front snap-fit plate; front snap-fit clasps are provided on two ends of a front surface of the board connector; the front snap-fit plate is buckled on a front end of the board connector by locking the front snap-fit clasp and the front snap-fit groove; an extension wall is extendedly provided on a front surface of the sliding block; the extension wall is inserted between the front snap-fit plate and the main body portion.

2. The high-speed connector for the automobile according to claim 1, wherein, a first pushing sloped surface is provided on an inner wall of the front snap-fit plate; the extension wall moves along a direction towards a top side of the housing and moves on the first pushing sloped surface to push the front snap-fit plate to open outward; the front snap-fit groove of the front snap-fit plate and the front snap-fit clasp of the board connector are disengaged to form an unlocked state.

3. The high-speed connector for the automobile according to claim 2, wherein, a second pushing sloped surface is provided on the extension wall, and when the extension wall moves along a direction towards the top side of the housing, the second pushing sloped surface moves along the first pushing sloped surface.

4. The high-speed connector for the automobile according to claim 1, wherein, a guide sloped surface is provided on an inner side of the front snap-fit plate below the front snap-fit groove.

5. The high-speed connector for the automobile according to claim 1, wherein, a running groove is provided on an inner side of the sliding block.

6. The high-speed connector for the automobile according to claim 5, wherein, a front side of the sliding block is provided with a front limiting clasp, and a front side of the main body portion of the housing is provided with a front snap-fit block corresponding to the front limiting clasp; when the side snap-fit clasps and the side snap-fit grooves are locked, the front limiting clasp is limitedly installed on the front snap-fit block; when the sliding block slides upward to unlock, the front limiting clasp is separated from the front snap-fit block.

7. The high-speed connector for the automobile according to claim 1, wherein, a partition plate matched with the board connector is provided under a rear side of the main body portion of the housing.

8. The high-speed connector for the automobile according to claim 1, wherein, the front snap-fit plate is integrated or two ends of the front snap-fit plate are divided into two independent groups.

9. The high-speed connector for the automobile according to claim 8, wherein, the two ends of the front snap-fit plate are divided into the two independent groups; a guide partition plate is provided between the two independent groups of front snap-fit plates; a pair of dividing grooves is provided on the guide partition plate to divide the guide partition plate into a first limiting portion, a middle guide portion and a second limiting portion, wherein the first limiting portion, the middle guide portion and the second limiting portion are connected to each other;

the board connector comprises a housing, a terminal and a shell, wherein the terminal is arranged in the housing of the board connector; the shell is wrapped around the housing of the board connector; a partial surface of the shell protrudes outward to form an accommodating space between the partial surface and the housing of the board connector, and the accommodating space is configured to accommodate the middle guide portion; the first limiting portion and the second limiting portion are engaged with an outside of the shell and on both sides of the accommodating space, respectively.

10. The high-speed connector for the automobile according to claim 8, wherein, the two ends of the front snap-fit plate are divided into the two independent groups; a guide partition plate is provided between the two independent groups of front snap-fit plates; a pair of dividing grooves is provided on the guide partition plate to divide the guide partition plate into a first guide portion, a middle limiting portion and a second guide portion, wherein the first guide portion, the middle limiting portion and the second guide portion are connected to each other;

the board connector comprises a housing, a terminal, and a shell, wherein the terminal is arranged in the housing of the board connector, and the shell is wrapped around the housing of the board connector;

a first partial surface and a second partial surface of the shell both protrude outward to form a first accommodating space between the first partial surface and the housing of the board connector and a second accommodating space between the second partial surface and the housing of the board connector; the first accommodating space and the second accommodating space are configured to accommodate the first guide portion and the second guide portion, respectively; and the middle limiting portion is engaged between an outside of the shell, the first accommodating space and the second accommodating space.

11. A high-speed connector for an automobile, comprising: a cable connector, a board connector connected to the cable connector and sliding blocks on two sides of the cable connector, wherein the sliding blocks on the two sides are configured to be separated or integrated; the cable connector comprises a housing, a contact body and a cable; the contact body is installed in the housing; the contact body is in contact with the board connector to achieve an electric connection; the cable is connected to the contact body and extends out of the housing; the housing comprises a main body portion and a side snap-fit plate provided on each side of the main body portion; a side snap-fit groove is formed through each of the side snap-fit plates; side snap-fit clasps are provided on two sides of the board connector; the side snap-fit plates are buckled on the two sides of the board connector by locking the side snap-fit clasps and the side snap-fit grooves; and the sliding blocks are installed on the side snap-fit plate, and are configured to slide along the side snap-fit plates;

wherein, a running groove is provided on an inner side of the sliding block;

wherein, a front side of the sliding block is provided with a front limiting clasp, and a front side of the main body portion of the housing is provided with a front snap-fit block corresponding to the front limiting clasp; when the side snap-fit clasps and the side snap-fit grooves are locked, the front limiting clasp is limitedly installed on the front snap-fit block; when the sliding block slides upward to unlock, the front limiting clasp is separated from the front snap-fit block; and wherein, a rear side of the sliding block is provided with a rear limiting clasp; a rear side of the main body portion of the housing is provided with a rear snap-fit block corresponding to the rear limiting clasp; the rear limiting clasp is installed on the rear snap-fit block, and the rear limiting clasp slides along the rear snap-fit block.

12. The high-speed connector for the automobile according to claim 11, wherein, a limiting step for preventing the rear snap-fit clasp from continuing to slide upwardly is provided above the rear snap-fit block of the main body portion.

* * * * *